US011029868B1

(12) United States Patent
Liu et al.

(10) Patent No.: US 11,029,868 B1
(45) Date of Patent: Jun. 8, 2021

(54) INITIALIZATION CODE/DATA MEMORY MAPPING SYSTEM (71) Applicant: Dell Products L.P., Round Rock, TX (US)

(72) Inventors: Wei Liu, Austin, TX (US); Po-Yu Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/775,386

(22) Filed: Jan. 29, 2020

(51) Int. Cl.
*G06F 13/00* (2006.01)
*G06F 3/06* (2006.01)
*G06F 9/30* (2018.01)
*G06F 9/4401* (2018.01)
*G06F 13/42* (2006.01)

(52) U.S. Cl.
CPC ............ *G06F 3/0632* (2013.01); *G06F 3/061* (2013.01); *G06F 3/0679* (2013.01); *G06F 9/30098* (2013.01); *G06F 9/4401* (2013.01); *G06F 13/4282* (2013.01)

(58) Field of Classification Search
CPC .. G06F 3/0632; G06F 9/4401; G06F 9/30098; G06F 3/061; G06F 3/0679; G06F 13/4282
See application file for complete search history.

(56) References Cited

U.S. PATENT DOCUMENTS

| | | | | |
|---|---|---|---|---|
| 9,417,884 | B2 * | 8/2016 | Maiolani | F02D 41/064 |
| 2013/0262739 | A1 * | 10/2013 | Bennett | G06F 3/0632 |
| | | | | 711/102 |
| 2014/0082262 | A1 * | 3/2014 | Nachimuthu | G06F 9/4403 |
| | | | | 711/103 |
| 2014/0095853 | A1 * | 4/2014 | Sarangshar | G06F 9/4401 |
| | | | | 713/1 |
| 2015/0286581 | A1 * | 10/2015 | Lee | G06F 3/0623 |
| | | | | 713/189 |
| 2016/0092121 | A1 * | 3/2016 | Nazari | G06F 3/0665 |
| | | | | 711/103 |
| 2019/0042272 | A1 * | 2/2019 | Kotary | G06F 9/4401 |
| 2019/0171505 | A1 * | 6/2019 | Nachimuthu | G06F 9/45558 |
| 2020/0371694 | A1 * | 11/2020 | Liu | G06F 3/0659 |
| 2020/0394144 | A1 * | 12/2020 | Osada | G06F 8/65 |

FOREIGN PATENT DOCUMENTS

KR 1020050028752 A * 3/2005

* cited by examiner

*Primary Examiner* — Jing-Yih Shyu
(74) *Attorney, Agent, or Firm* — Haynes and Boone, LLP (57) ABSTRACT

A initialization code/data memory mapping system includes a processing system, memory device(s) storing initialization code and initialization data, and a main memory system. The processing system performs first MMIO read operations to access the initialization code stored in the memory device(s) that is mapped to an initialization memory space in order to provide an initialization engine, and uses it to copy the initialization code from the memory device(s) to the main memory system. The processing system then accesses the initialization code stored in the main memory system in order to provide the initialization engine, and uses it to map the initialization data stored in the memory device(s) to the initialization memory space. The processing system then performs second MMIO read operations to access the initialization data stored in the memory device(s) that is mapped to the initialization memory space for use by the initialization engine.

15 Claims, 9 Drawing Sheets

INITIALIZATION CODE/DATA MEMORY MAPPING SYSTEM

BACKGROUND

The present disclosure relates generally to information handling systems, and more particularly to memory mapping initialization code and initialization data in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, perform initialization operations to initialize the computing device so that it may enter a runtime environment. For example, initialization operations for a computing device may be performed by a Basic Input/Output System (BIOS) engine that is provided via the execution of code or other instructions that may initially be stored on a first Serial Peripheral Interconnect (SPI) flash memory device that provides a "code Read Only Memory (ROM)", with that BIOS engine subsequently utilizing data stored on a second SPI flash memory device that provides a "data ROM". In many embodiments, the code ROM is mapped to a BIOS Memory Mapped Input/Output (MMIO) address space for the BIOS engine by default when the computing device initializes, which allows a Central Processing Unit (CPU) in the computing device to perform MMIO read operations to read the instructions on the code ROM provided by the first SPI flash memory device in order to provide the BIOS engine when the main memory system in the computing device is not available. In some computing devices, when the main memory system is available, the CPU may perform the MMIO read operations discussed above to provide the BIOS engine that then copies the contents of the code ROM provided by the first SPI flash memory device to the main memory system (e.g., to a Dynamic Random Access Memory (DRAM) device in the main memory system), and then subsequently provide the BIOS engine using the code or other instructions that were copied from the code ROM provided by the first SPI flash memory device to the main memory system.

However, during initialization operations and subsequent runtime operations, the BIOS engine provided using the code or other instructions that were copied from the code ROM provided by the first SPI flash memory device to the main memory system may read the contents of the data ROM provided by the second SPI flash memory device (e.g., Universally Extensible Firmware Interface (UEFI) variables, Non-Volatile Random Access Memory (NVRAM) attributes, Outside Equipment Manufacturer (OEM) identifiers, and/or other data ROM contents known in the art), which requires the use of SPI command read operations by the BIOS engine that are associated with relatively high amounts of overhead, or the conversion of MMIO read operations to SPI command read operations, and thus delay the completion of the initialization operations and the subsequent entering of the runtime environment by the computing device, as well as delay services (e.g., UEFI services, NVRAM services, OEM services, etc.) available in a runtime environment.

Accordingly, it would be desirable to provide a computing device initialization system that addresses the issues discussed above.

SUMMARY

According to one embodiment, an Information Handling System (IHS) includes a processing system that is configured to: access, via first Memory Mapped Input/Output (MMIO) read operations, initialization code stored in at least one memory device that is mapped to an initialization memory space in order to provide an initialization engine; copy, using the initialization engine, the initialization code from the at least one memory device to a main memory system; access the initialization code stored in the main memory system in order to provide the initialization engine; map, using the initialization engine provided via the initialization code stored in the main memory system, the initialization data stored in the at least one memory device to the initialization memory space; and access, via second MMIO read operations, the initialization data stored in the at least one memory device that is mapped to the initialization memory space for use by the initialization engine.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
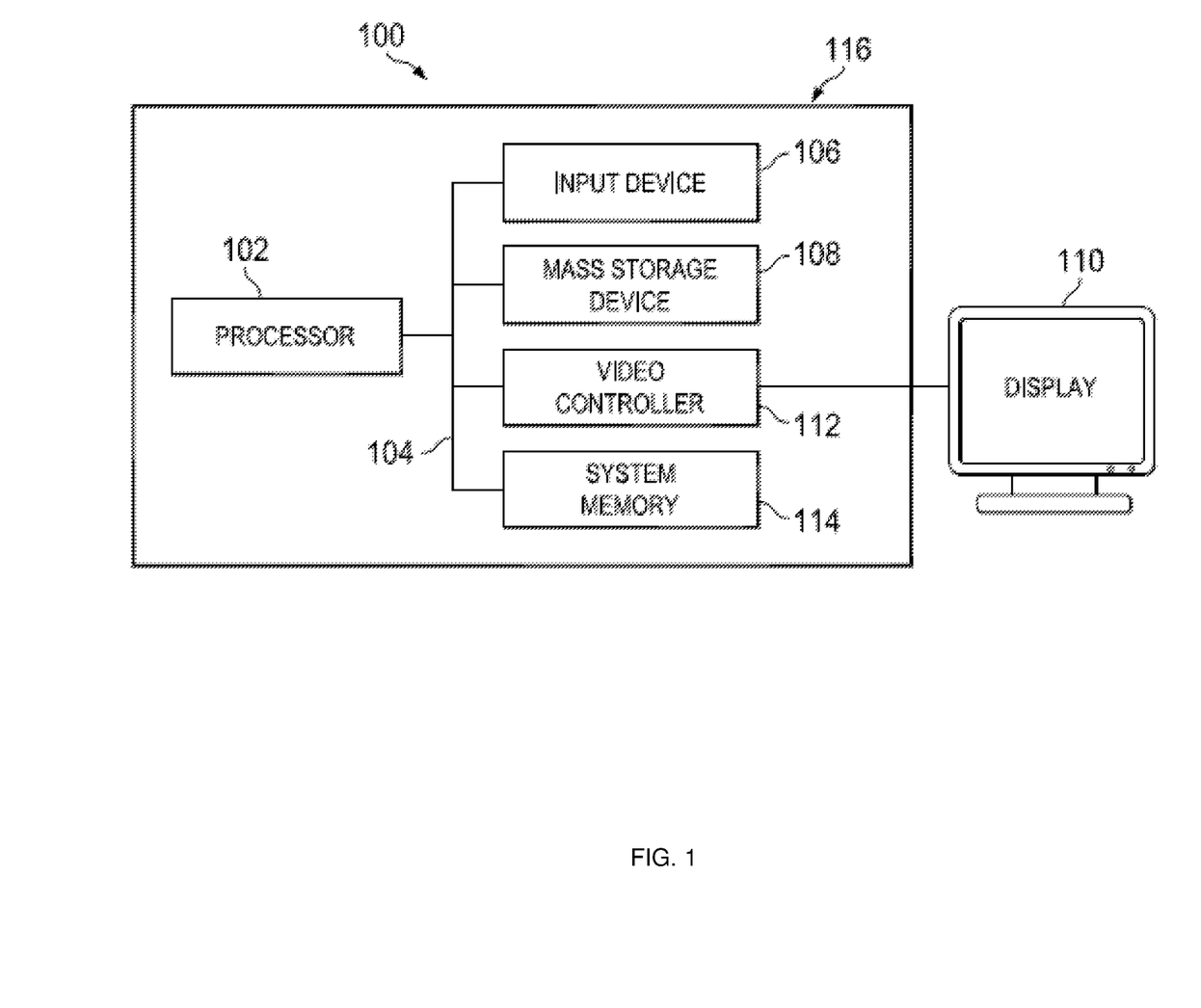
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
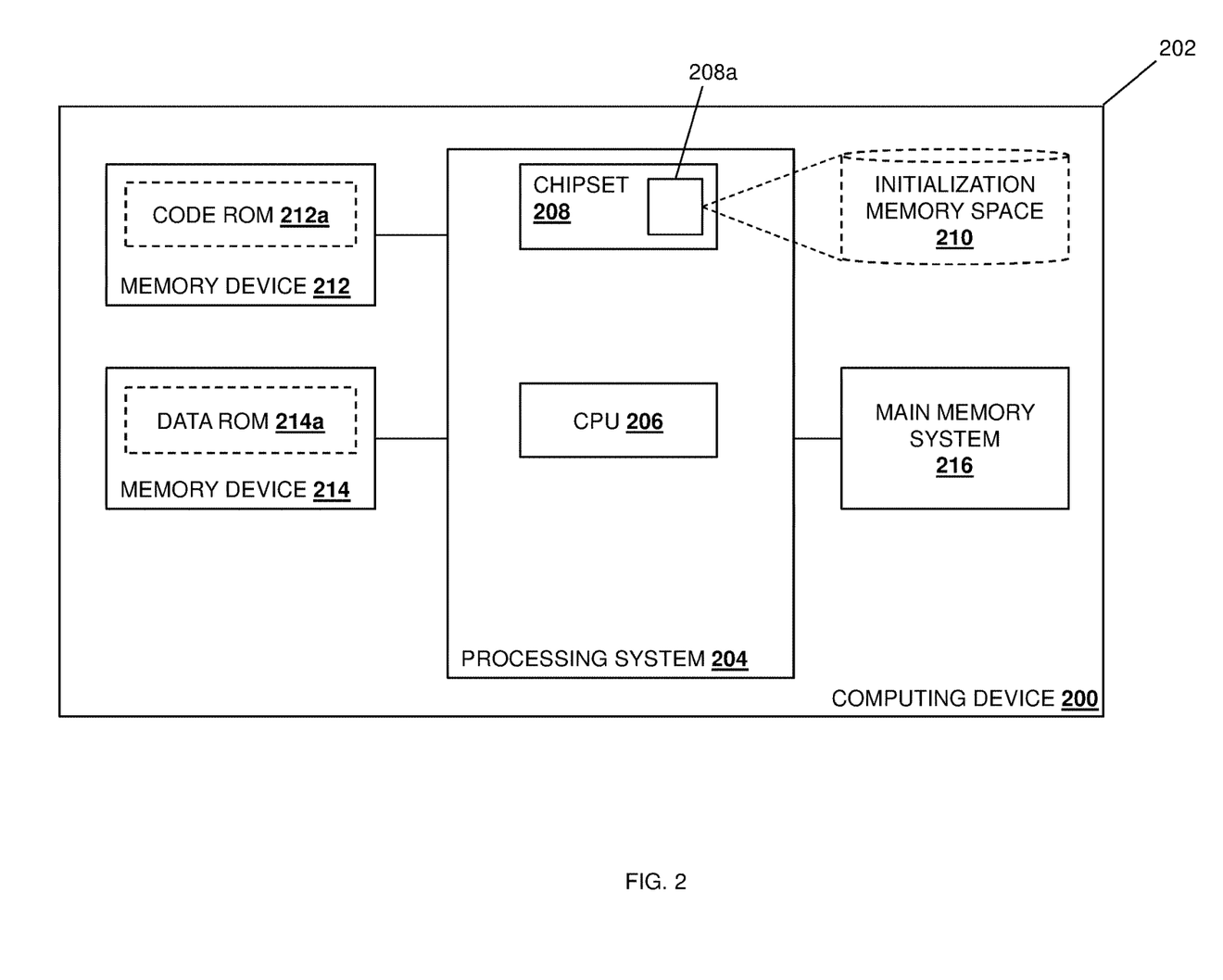
FIG. 2 is a schematic view illustrating an embodiment of a computing device that includes the initialization code/data memory mapping system of the present disclosure.

Referring now to FIG. 2, an embodiment of a computing device 200 is illustrated that may provide the initialization code/data memory mapping system of the present disclosure. In an embodiment, the computing device 200 may be provided by the IHS 100 discussed above with reference to FIG. 1 and/or may include some or all of the components of the IHS 100, and in specific examples may be provided by a server device, a desktop computing device, a laptop/notebook computing device, a tablet computing device, a mobile phone, and/or other computing devices that would be apparent to one of skill in the art in possession of the present disclosure. Furthermore, while one of skill in the art in possession of the present disclosure will recognize that the computing device 200 is illustrated and discussed as being provided by server device, the functionality of the computing device 200 discussed below may be provided by other devices that are configured to operate similarly as computing device 200 discussed below. In the illustrated embodiment, the computing device 200 includes a chassis 202 that houses the components of the computing device 200, only some of which are illustrated below.

For example, the chassis 202 may house a processing system 204 (e.g., which may include the processor 102 discussed above with reference to FIG. 1) that, as discussed below, may execute instructions that cause the processing system 204 to provide a initialization engine such as a Basic Input/Output System (BIOS) engine that is configured to perform the functionality of the initialization engines and/or computing devices discussed below. However, while described as providing a BIOS engine that is configured to perform BIOS functionality in many of the examples provided below, one of skill in the art in possession of the present disclosure will recognize that the BIOS engine described herein may be replaced by a Universally Extensible Firmware Interface (UEFI) engine that provides a software interface between an operating system and platform firmware, and that provides UEFI functionality that has been provided to replace BIOS functionality. As discussed in further detail below, in some specific examples the processing system 204 may be provided by ADVANCED MICRO DEVICES® of Santa Clara, Calif., United States, although other processing systems may fall within the scope of the present disclosure as well.

In the illustrated embodiment, the processing system 204 includes a Central Processing Unit (CPU) 206 that one of skill in the art in possession of the present disclosure will appreciate includes electronic circuitry that is configured to execute instructions (e.g., basic arithmetic, logic, control, and input/output instructions) to provide a variety of functionality. Furthermore, the processing system 204 also includes a chipset 208, which one of skill in the art in possession of the present disclosure will appreciate may provide a set of electronic components in an integrated circuit (e.g., also known as a "data flow management system") that is configured to manage data flow between the CPU 206, memory subsystems in the computing device (discussed below), and peripheral devices coupled to the processing system 204. In the illustrated embodiment, the chipset 208 includes a plurality of registers 208a that are configured to store information that defines an initialization memory space 210 (e.g., a BIOS memory space) that, as discussed in further detail below, may be utilized during initialization operations for the computing device 200, as well as runtime operations during a runtime environment of the computing device 200. However, while a specific processing system 204 is illustrated and described, one of skill in the art in possession of the present disclosure will appreciate that a variety of different processing systems may be utilized according to the teachings of the present disclosure while remaining within its scope as well.

The chassis 202 may also house a memory device 212 that is coupled to the processing system 204 and that provides an initialization "code" Read Only Memory (ROM) 212a that includes the code or other instructions for providing an initialization engine. Continuing with the example discussed above, the memory device 212 may be provided by a Serial Peripheral Interface (SPI) memory device that provides the code ROM 212a that includes code or other instructions for providing the BIOS engine described herein. Furthermore, the chassis 202 may also house a memory device 214 that is coupled to the processing system 204 and that provides an initialization "data" Read Only Memory (ROM) 214a that includes data utilized by an initialization engine during initialization operations and runtime operations. Continuing with the example discussed above, the memory device 214 may be provided by an SPI memory device that provides the data ROM 214a that includes data utilized the BIOS engine discussed above during initialization operations and runtime operations, which one of skill in the art in possession of the present disclosure in will appreciate may include UEFI variables, Non-Volatile Random Access Memory (NVRAM) attributes, Outside Equipment Manufacturer (OEM) identifiers, and/or any other initialization data known in the art. However, while separate memory devices are discussed as providing the code ROM and data ROM that include initialization code and initialization data, respectively, one of skill in the art in possession of the present disclosure will appreciate that a single memory device may provide both the code ROM and data ROM and thus store the initialization code and initialization data while remaining within the scope of the present disclosure as well.

Furthermore, the chassis 202 may also house a main memory system 216 that is coupled to the processing system 204, and that may be provided by Dynamic Random Access Memory (DRAM) devices and/or other main memory subsystems that would be apparent to one of skill in the art in possession of the present disclosure. However, while a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
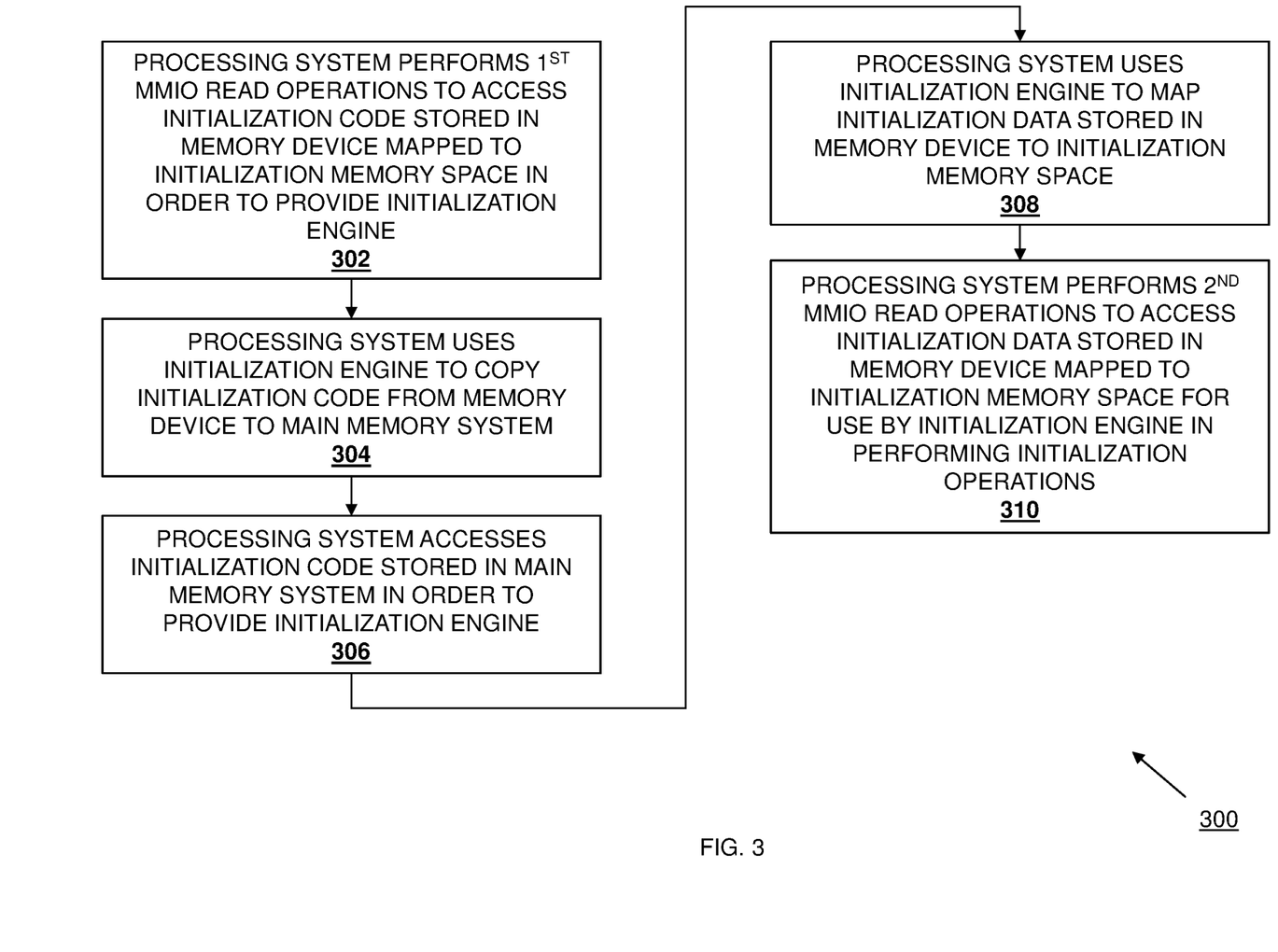
FIG. 3 is a flow chart illustrating an embodiment of a method for memory mapping initialization code and initialization data.

Referring now to FIG. 3, an embodiment of a method 300 for mapping initialization code memory and initialization data memory is illustrated. As discussed below, the systems and methods of the present disclosure provide for the mapping of initialization data in a memory device to an initialization memory space subsequent to the copying of initialization code in a memory device (which was mapped to the initialization memory space) to the main memory system, which allows a processing system to utilize Memory Mapped Input/Output (MMIO) read operations to provide a BIOS engine using the initialization code in the memory device mapped to the initialization memory space until that initialization code is copied to the main memory system, and then provide the BIOS engine using the initialization code in the main memory system while using MMIO read operations to read the initialization data in the memory device mapped to the initialization memory space. For example, a processing system may perform first MMIO read operations to access initialization code stored in the at least one memory device that is mapped to an initialization memory space in order to provide an initialization engine, use the initialization engine to copy the initialization code from the at least one memory device to the main memory system, and then access the initialization code stored in the main memory system in order to provide the initialization engine. The processing system may then use the initialization engine provided via the initialization code stored in the main memory system to map the initialization data stored in the at least one memory device to the initialization memory space, and perform second MMIO read operations to access the initialization data stored in the at least one memory device that is mapped to the initialization memory space for use by the initialization engine. As such, the time needed for the initialization engine to access of initialization data during initialization operations and runtime operations may be reduced via the use of processing system MMIO read operations relative to conventional systems that utilize slower processing system memory device read operations to access of the initialization data (e.g., Serial Peripheral Interface (SPI) read operations to access an SPI flash memory device.)

Figure 4:
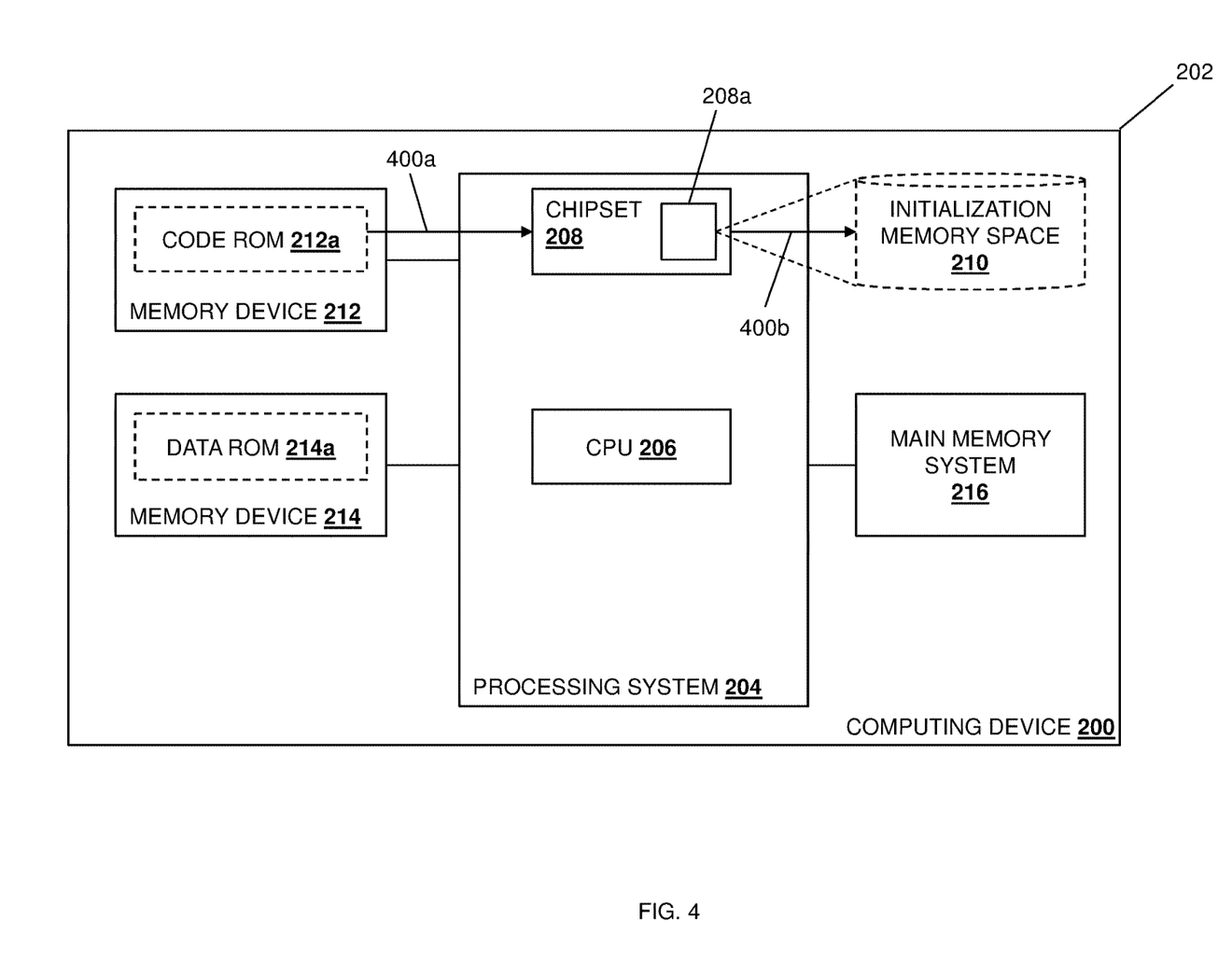
FIG. 4 is a schematic view illustrating an embodiment of the computing device of FIG. 2 operating during the method of FIG. 3.

The method 300 begins at block 302 where a processing system performs first MMIO read operations to access initialization code stored in a memory device mapped to initialization memory space in order to provide an initialization engine. In an embodiment, during or prior to the method 300, the computing device 200 may be powered on, booted, reset, and/or otherwise initialized in a manner that would be apparent to one of skill in the art in possession of the present disclosure. As will be appreciated by one of skill in the art in possession of the present disclosure, the plurality of registers 208a included in the chipset 208 may, by default, be programmed with first information (e.g., register values) that operate to map the code ROM 212a that is provided in the memory device 212 and that stores the initialization code (e.g., BIOS code) to the initialization memory space 210 (e.g., a BIOS memory space.) For example, the arrows 400a and 400b in FIG. 4 illustrates how, at the beginning of initialization operations following the initialization of the computing device 200, the registers 208a in the chipset 208 are configured to map the code ROM 212a in the memory device 212 to the initialization memory space 210.

For example, one of skill in the art in possession of the present disclosure will appreciate that the chipset in modern x86 processing systems such the Platform Controller Hub (PCH) available from INTEL® Corporation of Santa Clara, Calif., United States or the Fusion Controller Hub (FCH) available from ADVANCED MICRO DEVICES® of Santa Clara, Calif., United States, the registers may include default configurations that map the code ROM to an MMIO address region in the BIOS memory space (e.g., under 4G) so that the x86 startup code may be executed (e.g., via the reset vector) from the SPI flash memory device that provides the code ROM storing the BIOS code when the main memory system (e.g., the DRAM memory system) is not available. An example of a portion of the information that may be provided in the chipset registers to provide an MMIO-mapped code ROM is provided below:

```
FF000000: 00 00 00 00 00 00 00 00 - 00 00 00 00 00 00 00 00 *................*
FF000010: 78 E5 80 80 3D 8A 1C 4F - 99 35 89 61 85 C3 2D D3 *x...=..o.5.a..-.*
FF000020: 00 00 30 00 00 00 00 00 - 5F 46 56 48 FF FE 04 00 *..0......_FVH...*
FF000030: 48 00 3F E3 60 00 00 02 - 00 03 00 00 00 10 00 00 *h.?.`...........*
FF000040: 00 00 00 00 00 00 00 00 - FF FF FF FF FF FF FF FF *................*
```

However, while specific examples chipsets and chipset register configurations are provided, one of skill in the art in possession of the present disclosure will appreciate that other processing systems and techniques for initialization code MMIO address mapping will fall within the scope of the present disclosure as well.

Figure 5A:
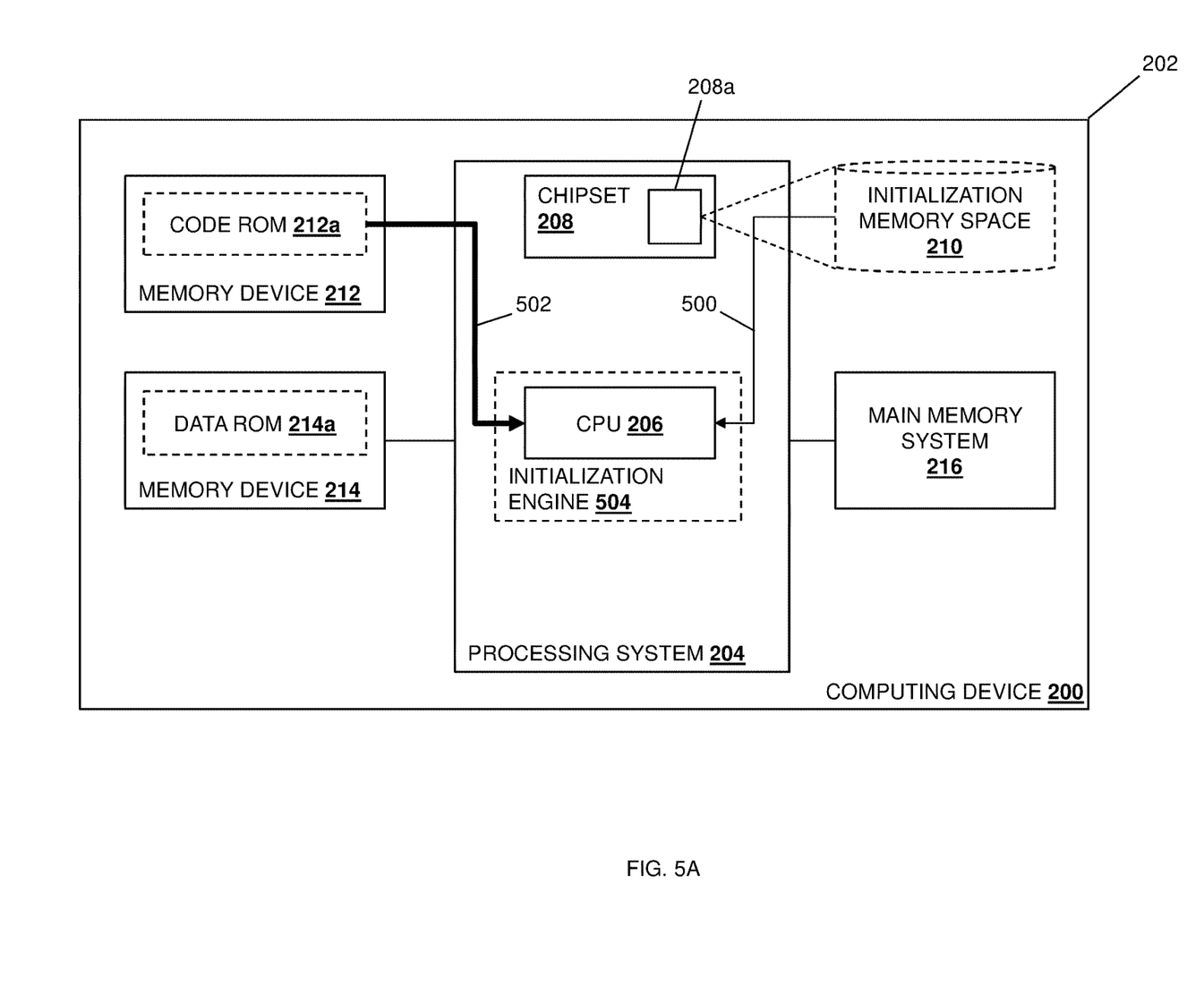
FIG. 5A is a schematic view illustrating an embodiment of the computing device of FIG. 2 operating during the method of FIG. 3.

Thus, in an embodiment of block 302, the processing system 204 may perform first MMIO read operations to access the initialization code stored in the memory device 212 that is mapped to the initialization memory space 210 in order to provide an initialization engine. For example, the arrow 500 in FIG. 5A illustrates how the CPU 206 may utilize the MMIO mapping in the initialization memory space 210 to the code ROM 212a to perform MMIO read operations 502 in order to read the initialization code (e.g., BIOS code) stored in the code ROM 212a and execute that initialization code in order to provide an initialization engine 504 (e.g., a BIOS engine.) For example, similarly as discussed above, the CPU 206 may use the reset vector that provides the default location for the first instruction to execute following the initialization of the computing device 200, and perform the MMIO read operations 502 based on that reset vector to execute that first instruction using the initialization code stored in the code ROM 212a in order to provide the initialization engine 504. However, while a specific initialization operation has been described above, one of skill in the art in possession of the present disclosure will appreciate that other initialization operations will fall within the scope of the present disclosure as well.

Figure 5B:
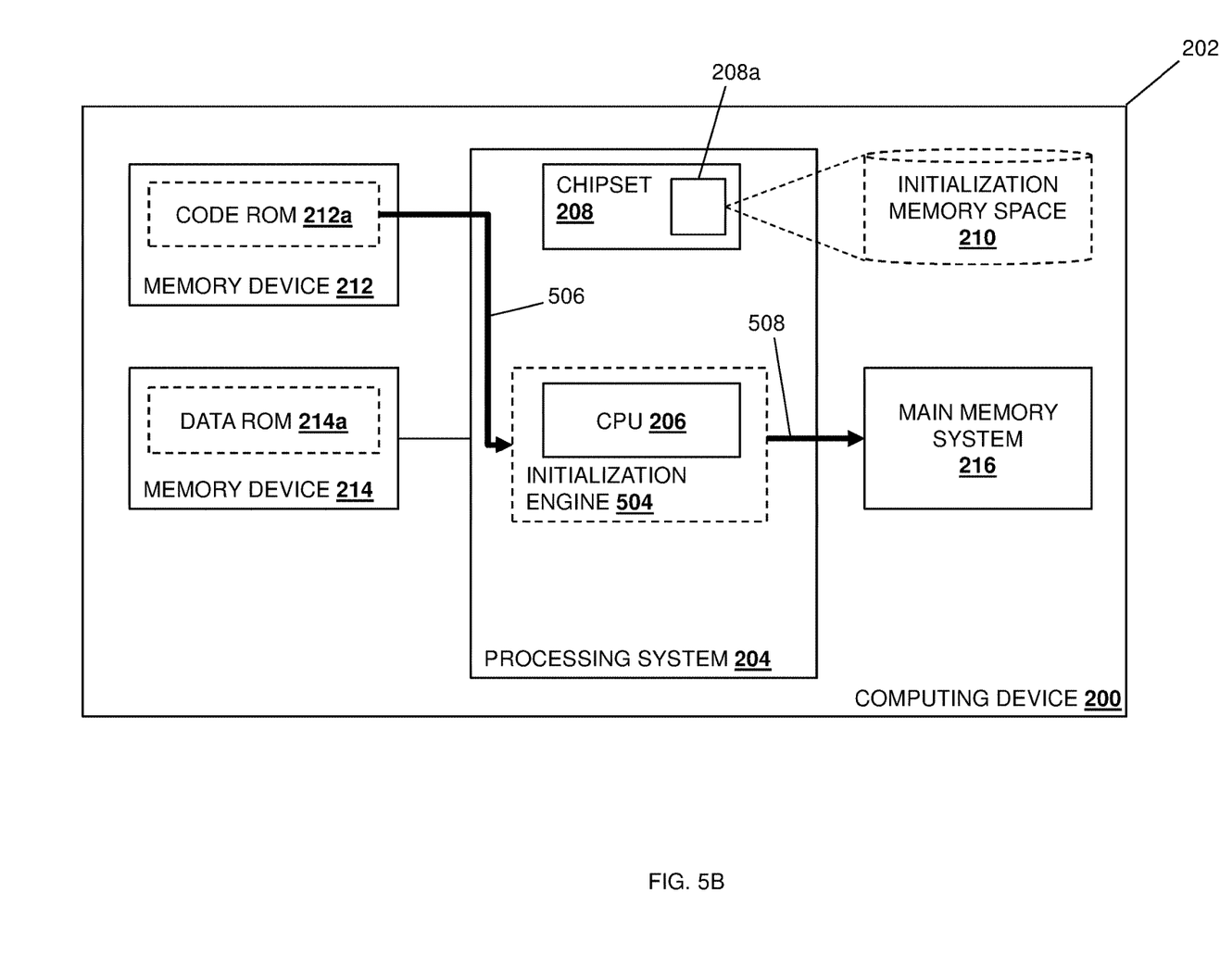
FIG. 5B is a schematic view illustrating an embodiment of the computing device of FIG. 2 operating during the method of FIG. 3.

The method 300 then proceeds to block 304 where the processing system uses the initialization engine to copy the initialization code from the memory device to a main memory system. In an embodiment, at block 304, the processing system 204 may use the initialization engine 504 to copy the initialization code stored in the memory device 212 to the main memory system 216. For example, FIG. 5B illustrates how the CPU 206 executing the initialization code (e.g., BIOS code) that is stored in the code ROM 212a provided by the memory device 212 to provide the initialization engine 504 (e.g., a BIOS engine) may then utilize that initialization engine 504 to perform read operations 506 to read the initialization code stored in the code ROM 212a provided by the memory device 212, and then perform write operations 508 to write that initialization code to the main memory system 216 (e.g., in a DRAM device included in the main memory system.) As such, following block 304, the initialization code stored in the code ROM 212a provided by the memory device 212 will also be stored in the main memory system 216.

As will be recognized by one of skill in the art in possession of the present disclosure, in some computing system platforms such as those provided by ADVANCED MICRO DEVICES® of Santa Clara, Calif., United States, the main memory system (e.g., DRAM devices) may be initialized relatively early following the initialization of the computing device 200 (e.g., via the initialization of the main memory system by the Platform Secure Processor (PSP) in such computing devices) such that it is available for use by the initialization engine 504 that is provided via the execution of the initialization code from the code ROM 212a provided by the memory device 212 (e.g., by the BIOS engine provided via the execution of the x86 startup code from the code ROM provided by an SPI flash memory device) to perform the operations discussed above with regard to block 304. However, while a specific computing device platform has been identified, one of skill in the art in possession of the present disclosure will appreciate that the teachings of the present disclosure will benefit other computing device platforms, and thus those other computing devices platforms will fall within the scope of the present disclosure as well.

Figure 6A:
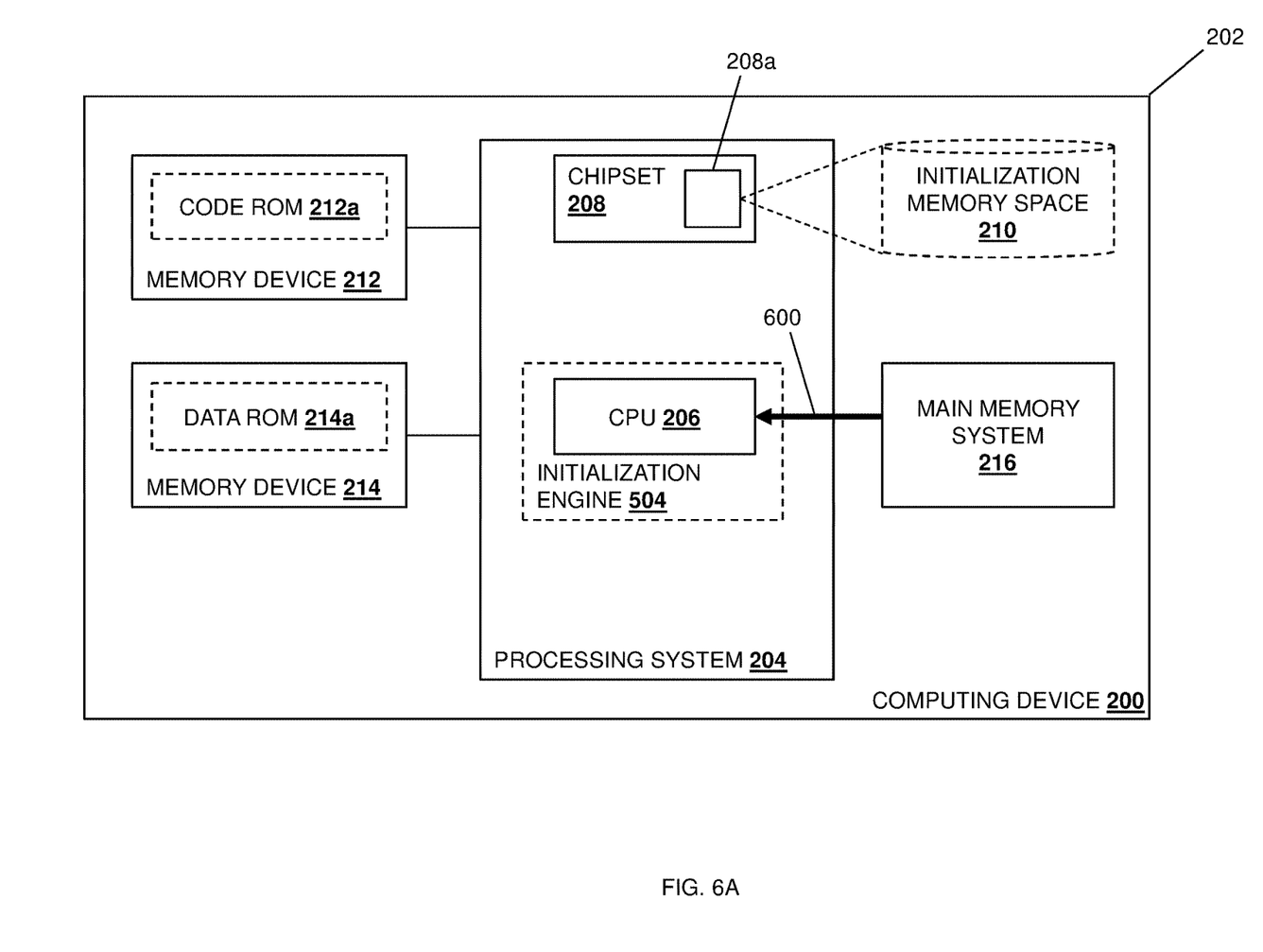
FIG. 6A is a schematic view illustrating an embodiment of the computing device of FIG. 2 operating during the method of FIG. 3.

The method 300 then proceeds to block 306 where the processing system accesses the initialization code stored in the main memory system in order to provide the initialization engine. In an embodiment, at block 306, the processing system 204 may switch from providing the initialization engine 504 using the initialization code stored in the code ROM 212a provided by the memory 212 to providing the initialization engine 504 using the initialization code that was copied to (and thus is now also stored in) the main memory system 216. For example, FIG. 6A illustrates how the CPU 206 may perform read operations 600 in order to read the initialization code (e.g., BIOS code) that is stored in the main memory system 216 and execute that initialization code to provide the initialization engine 504 (e.g., a BIOS engine.) As such, at and following block 306, the initialization engine 504 may be provided by the CPU 206 executing initialization code that is stored in the main memory system 216, rather than the initialization code that is stored in the code ROM 212a provided by the memory device 212.

Figure 6B:
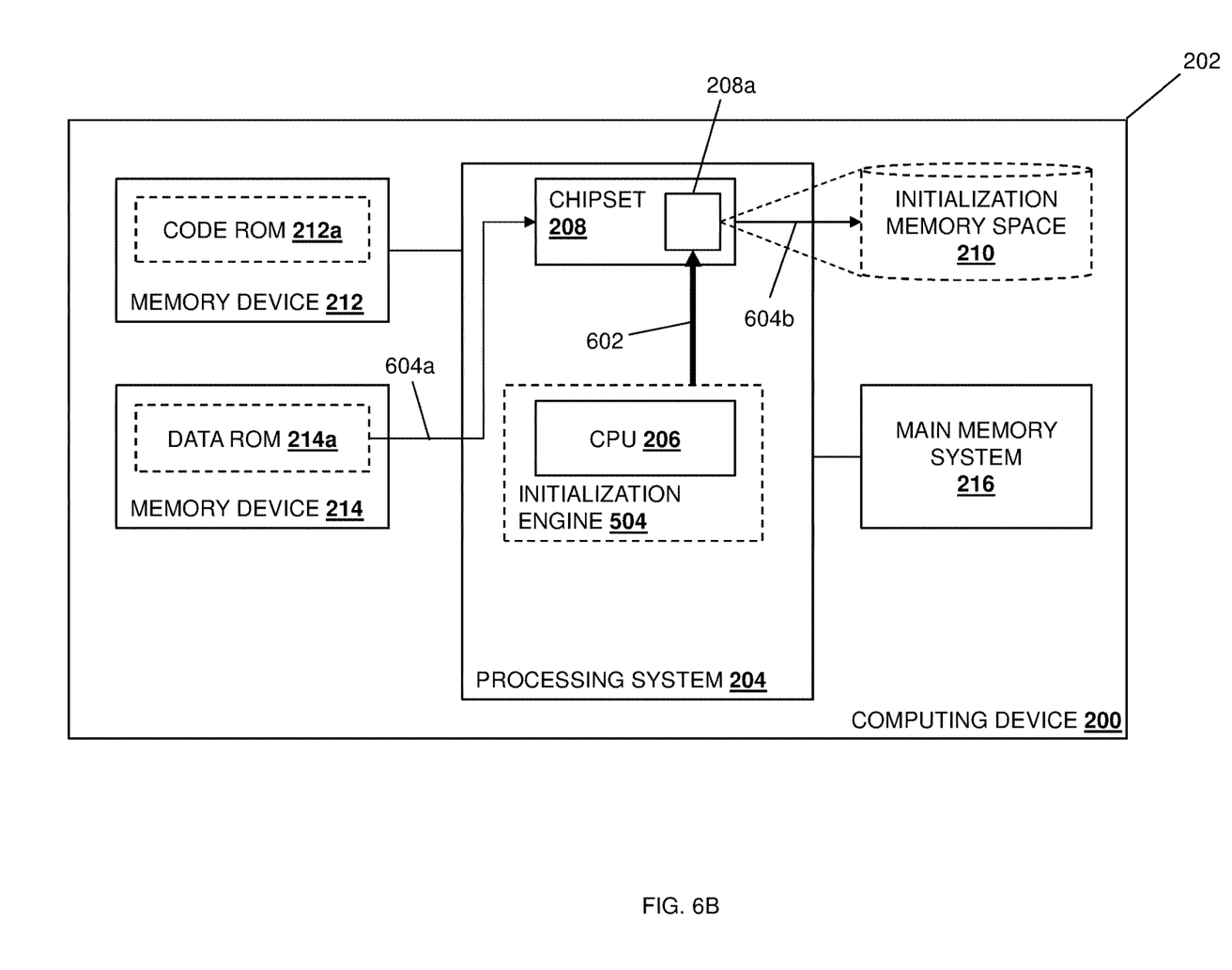
FIG. 6B is a schematic view illustrating an embodiment of the computing device of FIG. 2 operating during the method of FIG. 3.

The method 300 then proceeds to block 308 where the processing system uses the initialization engine to map initialization data stored in a memory device to the initialization memory space. In an embodiment, at block 308, the processing system 204 may operate to utilize the initialization engine 504 (which as discussed above is provided via the execution of the initialization code that is now stored in the main memory system 216) to map the initialization data stored in the data ROM 214a provided by the memory device 214 to the initialization memory space 210. For example, FIG. 6B illustrates how the CPU 206 may utilize the initialization engine 504 (e.g., a BIOS engine) at block 308 to perform mapping operations 602 that operate to reconfigure the registers 208a in the chipset 208 in order to map the initialization data (e.g., UEFI variables, NVRAM attributes, OEM identifiers, etc.) stored in the data ROM 214a provided by the memory device 214 to the initialization memory space 210 (e.g., a BIOS memory space), and the mapping of the initialization data stored in the data ROM 214a provided by the memory device 214 to the initialization memory space 210 is represented in FIG. 6B by the arrows 604a and 604b.

An example of a portion of the information that may be provided in the chipset registers to provide an MMIO-mapped data ROM is provided below:

```
FF000000:  5F  46  44  48  44  00  41  00 - 54  00  41  00  52  00  4F  00   *_FDHD.A.T.A.R.O..*
FF000010:  4D  00  00  00  00  00  00  00 - 00  00  00  00  00  00  00  00   *M.................*
FF000020:  00  00  00  00  00  00  00  00 - 00  00  00  00  00  00  00  00   *..................*
FF000030:  00  00  00  00  00  00  00  00 - 00  00  00  00  00  00  00  00   *..................*
FF000040:  00  00  00  00  6A  00  0B  E9 - 96  B8  FB  A1  BB  4E  B9  F4   *....j........N....*
```

As will be appreciated by one of skill in the art in possession of the present disclosure (e.g., from the different portions of the information discussed above as being provided in the chipset registers to provide the MMIO-mapped code ROM and the MMIO-mapped data ROM), the mapping of the initialization data stored in the data ROM 214a provided by the memory device 214 to the initialization memory space 210 may replace the mapping of the initialization code stored in the code ROM 212a provided by the memory device 212 to the initialization memory space 210 (e.g., the MMIO addresses FF000000, FF000010, FF000020, FF000030, AND FF0000040 in the examples above that are initially mapped to the code ROM 212a may be mapped to the data ROM 214a at block 308.)

Figure 7:
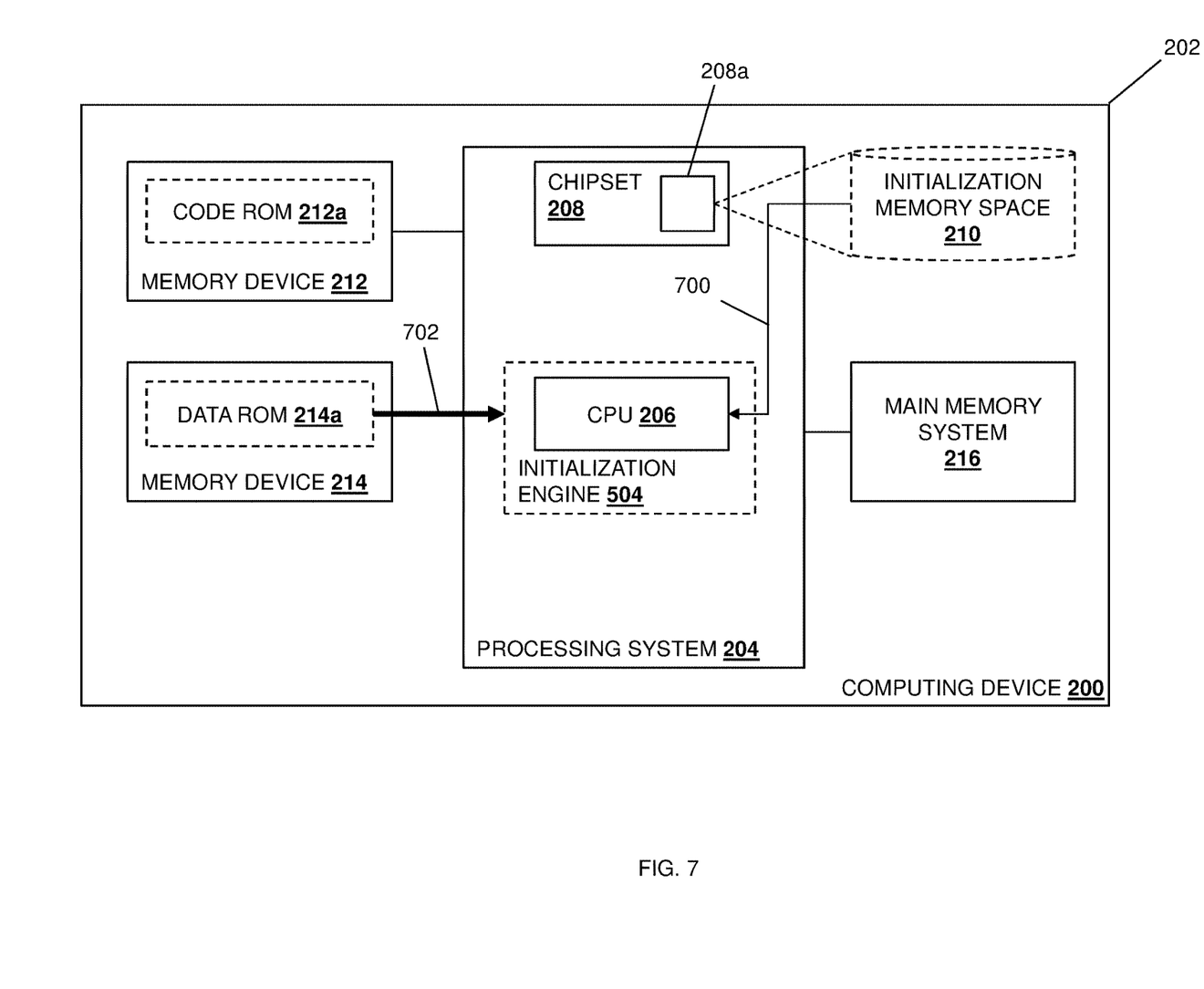
FIG. 7 is a schematic view illustrating an embodiment of the computing device of FIG. 2 operating during the method of FIG. 3.

The method 300 then proceeds to block 310 where the processing system performs second MMIO read operations to access the initialization data stored in the memory device mapped to the initialization memory space for use by the initialization engine. In an embodiment, at block 310, the processing system 204 may performs MMIO read operations to access the initialization data stored in the data ROM 214a provided by the memory device 214 for use by the initialization engine 504. For example, the arrow 700 in FIG. 7 illustrates how the CPU 206 may utilize the MMIO mapping in the initialization memory space 210 (e.g., a BIOS memory space) to the data ROM 214a to perform MMIO read operations 702 in order to allow the initialization engine 504 (e.g., a BIOS engine) to read the initialization data (e.g., UEFI variables, NVRAM attributes, OEM identifiers, etc.) stored in the data ROM 214a for use in performing initialization operations (e.g., during a Power On Self Test (POST)), runtime operations, and/or any other operations that would be apparent to one of skill in the art in possession of the present disclosure. As such, the data ROM MMIO-mapping may persist through initialization operations and into the runtime environment provided for the computing device.

As will be apparent to one of skill in the art in possession of the present disclosure, the use of the MMIO read operations to allow the initialization engine 504 to read the initialization data stored in the data ROM 214a provided by the memory device 214 may provide for relatively fast and efficient read operations relative to conventional memory device read operations performed to access the initialization data stored in the data ROM 214a provided by the memory device 214. For example, one of skill in the art in possession of the present disclosure will appreciate that initialization data is conventionally read via SPI command read operations performed on an SPI flash memory device that provides the data ROM storing that initialization data, and is associated relatively high amounts of overhead that cause those SPI command read operations to take substantially more time than the MMIO read operations discussed above, and thus the systems and methods of the present disclosure provide a reduction of the amount of time required for a initialization engine (e.g., a BIOS engine) to read initialization data (e.g., UEFI variables, NVRAM attributes, OEM identifiers, etc.) Furthermore, one of skill in the art in possession of the present disclosure will recognize that replacement of the mapping of the initialization code stored in the code ROM 212a provided by the memory device 212 to the initialization memory space 210 with the mapping of the initialization data stored in the data ROM 214a provided by the memory device 214 to the initialization memory space 210 may provide a variety of security benefits associated with the code ROM 212a becoming "invisible" to third-party option ROMs and/or the operating system (and specifically, exploits of those third-party option ROMs and/or the operating system) in the computing device due to that mapping replacement.

Thus, systems and methods have been described that provide for the mapping of a data ROM provided by a second SPI flash memory device to a BIOS memory space subsequent to the copying of BIOS code stored in a code ROM provided by a first SPI flash memory device (which was mapped to the BIOS memory space) to the main memory system, which allows CPU to utilize Memory Mapped Input/Output (MMIO) read operations to provide a BIOS engine using the BIOS code stored in the code ROM provided by the first SPI flash memory device mapped to the BIOS memory space until that BIOS code is copied to the main memory system, and then provide the BIOS engine using the BIOS code in the main memory system while using MMIO read operations to read the data on the data ROM provided by the second SPI flash memory device that is mapped to the BIOS memory space. For example, a CPU may perform first MMIO read operations to access BIOS code stored in a first SPI flash memory device that is mapped to a BIOS memory space in order to provide an BIOS engine, use the BIOS engine to copy the BIOS code from the first SPI flash memory device to the main memory system, and then access the BIOS code stored in the main memory system in order to provide the BIOS engine. The CPU may then use the BIOS engine provided via the BIOS code stored in the main memory system to map the data ROM stored in the second SPI flash memory device to the BIOS memory space, and perform second MMIO read operations to access the data stored in data ROM provided by the second SPI flash memory device that is mapped to the BIOS memory space for use by the BIOS engine. As such, the time needed for the BIOS engine to access of data stored in the data ROM may be reduced via the use of processing system MMIO read operations relative to conventional systems that utilize slower Serial Peripheral Interface (SPI) command read operations to access of the data stored in the data ROM provided by an SPI flash memory device.

To provide a specific example of the implementation of the initialization code/data memory mapping system of the present disclosure, an example of computing device functionality provided in computing devices utilizing processing systems available from ADVANCED MICRO DEVICES® of Santa Clara, Calif., United States is provided below. In this embodiment, a Platform Secure Processor (PSP) in the computing device may copy the reset vector code to target the DRAM and CPU when the computing device comes out of reset. Secure Execution Code (SEC) may then be executed from the DRAM to copy the code ROM from MMIO to target the DRAM and enter the Pre-EFI Initialization (PEI) phase of execution, as well as map the contents of the data ROM to the MMIO. PEI code may then be executed from the DRAM to access data via MMIO reads, while reporting FVMAIN and DXEIPL and preparing to enter the Drive eXecution Environment (DXE) phase. DXE code may then be executed from the DRAM to read data from the MMIO, while locking the ROM switch register such that it can only be enabled in System Management Mode (SMM). Boot Device Selection (BDS) then initializes a boot device and prepares to boot into the operating system. Subsequently during operating system runtime, the code ROM is invisible, and the data ROM is writable only in SMM.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An initialization code/data memory mapping system, comprising:
   at least one memory device storing initialization code and initialization data;
   a main memory system; and
   a processing system that is coupled to the at least one memory device and the main memory system, wherein the processing system is configured to:
   access, via first Memory Mapped Input/Output (MMIO) read operations, the initialization code stored in the at least one memory device that is mapped to an initialization memory space in order to provide an initialization engine;
   copy, using the initialization engine, the initialization code from the at least one memory device to the main memory system;
   access the initialization code stored in the main memory system in order to provide the initialization engine;
   map, using the initialization engine provided via the initialization code stored in the main memory system, the initialization data stored in the at least one memory device to the initialization memory space, wherein the mapping the initialization data stored in the at least one memory device to the initialization memory space hides the initialization code in a runtime environment that is provided following completion of initialization operations by unmapping the initialization code stored in the at least one memory device from the initialization memory space; and
   access, via second MMIO read operations, the initialization data stored in the at least one memory device that is mapped to the initialization memory space for use by the initialization engine.

2. The system of claim 1, wherein the at least one memory device includes a first memory device that stores the initialization code, and a second memory device that stores the initialization data.

3. The system of claim 2, wherein the first memory device is provided by a Serial Peripheral Interface (SPI) flash memory device, and wherein the second memory device is provided by a second SPI flash memory device.

4. The system of claim 1, further comprising:
   a chipset that is included in the processing system and that has at least one register, wherein the register is configured to store first information to map the initialization code stored in the at least one memory device to the initialization memory space, and second information to map the initialization data stored in the at least one memory device to the initialization memory space.

5. The system of claim 4, further comprising:
   a Central Processing Unit (CPU) that is coupled to the chipset and configured to perform the first MMIO read operations, provide the initialization engine, and perform the second MMIO read operations.

6. An Information Handling System (IHS), comprising:
   a processing system that is configured to:
   access, via first Memory Mapped Input/Output (MMIO) read operations, initialization code stored in at least one memory device that is mapped to an initialization memory space in order to provide an initialization engine;
   copy, using the initialization engine, the initialization code from the at least one memory device to a main memory system;
   access the initialization code stored in the main memory system in order to provide the initialization engine;
   map, using the initialization engine provided via the initialization code stored in the main memory system, initialization data stored in the at least one memory device to the initialization memory space, wherein the mapping the initialization data stored in the at least one memory device to the initialization memory space hides the initialization code in a runtime environment that is provided following completion of initialization operations by unmapping the initialization code stored in the at least one memory device from the initialization memory space; and
   access, via second MMIO read operations, the initialization data stored in the at least one memory device that is mapped to the initialization memory space for use by the initialization engine.

7. The IHS of claim 6, wherein the at least one memory device includes a first memory device that stores the initialization code, and a second memory device that stores the initialization data.

8. The IHS of claim 7, wherein the first memory device is provided by a Serial Peripheral Interface (SPI) flash memory device, and wherein the second memory device is provided by a second SPI flash memory device.

9. The IHS of claim 6, further comprising:
   a chipset that is included in the processing system and that has at least one register, wherein the register is configured to store first information to map the initialization code stored in the at least one memory device to the initialization memory space, and second information to map the initialization data stored in the at least one memory device to the initialization memory space.

10. The IHS of claim 9, further comprising:
    a Central Processing Unit (CPU) that is coupled to the chipset and configured to perform the first MMIO read operations, provide the initialization engine, and perform the second MMIO read operations.

11. A method for mapping initialization code memory and initialization data memory, comprising:
    accessing, by a processing system via first Memory Mapped Input/Output (MMIO) read operations, initialization code stored in at least one memory device that is mapped to an initialization memory space in order to provide an initialization engine;
    copying, by the processing system using the initialization engine, the initialization code from the at least one memory device to a main memory system;
    accessing, by the processing system, the initialization code stored in the main memory system in order to provide the initialization engine;
    mapping, by the processing system using the initialization engine provided via the initialization code stored in the main memory system, the initialization data stored in the at least one memory device to the initialization memory space, wherein the mapping the initialization data stored in the at least one memory device to the initialization memory space hides the initialization code in a runtime environment that is provided following completion of initialization operations by unmapping the initialization code stored in the at least one memory device from the initialization memory space; and accessing, by the processing system via second MMIO read operations, the initialization data stored in the at least one memory device that is mapped to the initialization memory space for use by the initialization engine.

12. The method of claim 11, wherein the at least one memory device includes a first memory device that stores the initialization code, and a second memory device that stores the initialization data.

13. The method of claim 12, wherein the first memory device is provided by a Serial Peripheral Interface (SPI) flash memory device, and wherein the second memory device is provided by a second SPI flash memory device.

14. The method of claim 11, further comprising:
storing, in at least one register provided in a chipset that is included in the processing system, first information to map the initialization code stored in the at least one memory device to the initialization memory space; and
storing, in the at least one register provided in the chipset that is included in the processing system, second information to map the initialization data stored in the at least one memory device to the initialization memory space.

15. The method of claim 14, further comprising:
performing, by a Central Processing Unit (CPU) that is included in the processing system and coupled to the chipset, the first MMIO read operations;
providing, by the CPU, the initialization engine; and
performing, by the CPU, the second MMIO read operations.

* * * * *